US008234761B2

(12) United States Patent
Gompert et al.

(10) Patent No.: US 8,234,761 B2
(45) Date of Patent: Aug. 7, 2012

(54) WIRE-GATE CARABINER

(75) Inventors: Peter T. Gompert, Huntsville, UT (US); Jacob Hall, Draper, UT (US); Paul Terry, Park City, UT (US); Benjamin Walker, Draper, UT (US); Bill Belcourt, Salt Lake City, UT (US)

(73) Assignee: Black Diamond Equipment Ltd., Salt Lake City, UT (US)

( * ) Notice: Subject to any disclaimer, the term of this patent is extended or adjusted under 35 U.S.C. 154(b) by 47 days.

(21) Appl. No.: 12/636,111

(22) Filed: Dec. 11, 2009

(65) Prior Publication Data
US 2011/0138586 A1 Jun. 16, 2011

(51) Int. Cl.
*F16B 45/02* (2006.01)

(52) U.S. Cl. .................. 24/599.4; 24/601.8; 294/82.19

(58) Field of Classification Search .......... 24/599.1, 24/601.3, 601.5, 601.8, 599.5, 599.4; 294/82.19, 294/82.2
See application file for complete search history.

(56) References Cited

U.S. PATENT DOCUMENTS

| 2002/0050032 | A1 | 5/2002 | Carnall | |
|---|---|---|---|---|
| 2005/0246874 | A1* | 11/2005 | Hsu | 24/598.2 |
| 2005/0246875 | A1 | 11/2005 | Brown | |
| 2006/0174458 | A1 | 8/2006 | Carnall et al. | |
| 2008/0222859 | A1* | 9/2008 | Chepurny et al. | 24/599.2 |
| 2009/0178250 | A1 | 7/2009 | Brown et al. | |
| 2010/0125984 | A1* | 5/2010 | Petzl et al. | 24/599.6 |

FOREIGN PATENT DOCUMENTS

| DE | 60115551 T2 | 8/2006 |
|---|---|---|
| EP | 1178227 | 2/2002 |
| EP | 1178227 A1 | 2/2002 |
| EP | 1178227 B1 | 2/2002 |
| EP | 1624203 B1 | 2/2006 |
| ES | 2256175 T3 | 7/2006 |
| FR | 2820474 | 8/2002 |
| GB | 2365486 | 2/2002 |
| GB | 2365486 A | 2/2002 |
| GB | 2365486 B | 2/2002 |

* cited by examiner

*Primary Examiner* — Robert J. Sandy
*Assistant Examiner* — Michael Lee
(74) *Attorney, Agent, or Firm* — Trent Baker; Baker & Associates PLLC (57) ABSTRACT

One embodiment of the present invention relates to an improved wire-gate carabiner system including a frame, gate, and gate biasing system. The gate is pivotably coupled to the frame across an opening to form a continuously enclosed inner region in a closed configuration. The gate may be referred to as a wire-type gate in that it includes an arch and two ends. The arch is looped over a hook disposed on the keyed region of the frame in the closed configuration. The two ends are pivotably coupled to the frame at two independent gate coupling points on the pivot region so as to utilize the torsional rigidity of the gate structure as the gate biasing system. The keyed region of the frame includes a hook and a cover. The cover is oriented and shaped to laterally shield the arch and hook from undesirable couplings.

20 Claims, 8 Drawing Sheets

WIRE-GATE CARABINER

FIELD OF THE INVENTION

The invention generally relates to mechanical coupling mechanisms such as carabiners and snap-hooks. In particular, the invention relates to an improved wire-gate carabiner system.

BACKGROUND OF THE INVENTION

Carabiners, snap-hooks, and releasable clamps are used in a variety of applications for releasably coupling objects to one another. For example, a rock climber may use one or more carabiners to releasably secure a rope to a protection device during vertical ascension. Carabiners generally include a frame, a gate, and a releasable gate closure mechanism. The gate is configured to releasably engage the frame so as to form a continuous inner region which can mechanically couple to one or more objects. The releasable gate closure mechanism is configured to allow the gate to be selectively pivoted with respect to the frame to facilitate addition or removal of items from the continuous inner region. The releasable gate closure mechanism simultaneously biases the gate toward a closed configuration with respect to the frame so as to maintain mechanical coupling of items within the continuous inner region. A wide variety of frame, gate, and biasing systems exist to specifically accommodate particular applications and/or manufacturing costs for the carabiner.

Wire-gate type carabiners represent a particular gate construction, biasing system, and gate-frame interface. Wire-gate carabiners utilize a substantially elongated, looped rigid wire member for the gate portion of the carabiner system. In general, the lengthwise ends of the wire member gate are oppositely coupled to the frame such that the spring/rebound rigidity of the gate creates the automatic biasing mechanism. As the gate is selectively pivoted about the frame coupling point, the torsional properties of the wire automatically generate a biasing force that mechanically urges the gate back toward the closed configuration. The frame includes a gate interface region which generally includes a hook over which the loop of the gate is configured to extend while in the closed configuration. The reliable positioning of the loop with respect to the hook significantly affects the structural ability of the carabiner to counteract shear forces. Due to the inherent minimal gate thickness, wire-gate type carabiners are usually lighter in overall weight than other corresponding carabiners. However, the unique requirements and limitations of the gate/frame interface have resulted in an inability to manufacture wire-gate type carabiners for certain applications.

A variety of specialized carabiner designs are configured to include specific mechanical characteristics that optimize particular functionalities. One type of specialized carabiner includes a hookless or keyed engagement coupling scheme between the gate and frame when in the closed configuration. This type of gate/frame engagement scheme optimizes the engagement and disengagement of the carabiner with particular items such as a bolt hanger or a non-sling protection device. However, structural modifications must be incorporated to the gate/frame interface to maintain the necessary reliable coupling between the gate and frame in the closed configuration. For example, some form of three-dimensional keyed interface must generally be incorporated to provide the necessary engagement between the gate and frame. The three dimensional keyed interface increases the reliability of the coupling between the gate and frame without the introduction of a hook structure. Various problems exist with conventional hookless carabiners, including manufacturing cost, susceptibility to debris-related obstruction, durability, and weight.

Therefore, there is a need in the industry for a carabiner that overcomes the limitations of existing systems in a cost efficient manner.

SUMMARY OF THE INVENTION

The present invention relates to mechanical coupling mechanisms such as carabiners and snap-hooks. One embodiment of the present invention relates to an improved wire-gate carabiner system including a frame, gate, and gate biasing system. The gate is pivotably coupled to the frame across an opening to form a continuously enclosed inner region in a closed configuration. The gate may be pivoted with respect to the frame about a pivot region to form the open configuration. The gate biasing system mechanically biases the gate toward the closed configuration. The gate may be referred to as a wire-type gate in that it includes an arch and two ends. The arch is looped over a hook disposed on the keyed region of the frame in the closed configuration. The two ends are pivotably coupled to the frame at two independent gate coupling points on the pivot region, so as to utilize the torsional rigidity of the gate structure as the gate biasing system. The keyed region of the frame includes a hook and a cover. The cover is oriented and shaped to laterally shield the arch and hook from undesirable couplings. The cover is oriented to laterally cover the sides of the hook such that an item that is being removed from the carabiner will not attach or catch the hook as it is being removed from the inner region in the open configuration. The cover further increases the reliability of the releasable coupling between the gate and the hook in the closed configuration by minimizing potential lateral obstructions from contacting the arch of the gate. Alternative embodiments may utilize differing cover shapes, compositions, and structures including but not limited to two-component shapes, plastic compositions, and non-wire structures.

Embodiments of the present invention represent a significant advance in the field over conventional wire-gate and hookless type carabiners. Embodiments of the present invention incorporate the beneficial weight saving characteristics of conventional wire-gate carabiners by utilizing a gate which may be composed of an elongated wire structure having a recess rather than solid composition. In addition, the wire gate design enables the simplification of the gate biasing system by utilizing the torsional rigidity of the gate to effectuate the mechanical biasing force rather than a spring type mechanism. In addition, embodiments incorporate an efficient, simplified shape design that minimizes manufacturing costs by avoiding complex concave regions with tight operational tolerance parameters. The cover further prevents undesirable catching or hooking thereby increasing the releasable coupling between the gate and frame in the closed configuration. The cover also increases the durability and overall life of the product by allowing debris to flow through the cover rather than be contained within an enclosed three dimensional key-lock type recess.

These and other features and advantages of the present invention will be set forth or will become more fully apparent in the description that follows and in the appended claims. The features and advantages may be realized and obtained by means of the instruments and combinations particularly pointed out in the appended claims. Furthermore, the features and advantages of the invention may be learned by the practice of the invention or will be obvious from the description, as set forth hereinafter.

BRIEF DESCRIPTION OF THE DRAWINGS

The following description of the invention can be understood in light of the Figures, which illustrate specific aspects of the invention and are a part of the specification. Together with the following description, the Figures demonstrate and explain the principles of the invention. The Figures presented in conjunction with this description are views of only particular—rather than complete—portions of the systems and methods of making and using the system according to the invention. In the Figures, the physical dimensions may be exaggerated for clarity.

DETAILED DESCRIPTION OF THE INVENTION

The present invention relates to mechanical coupling mechanisms such as carabiners and snap-hooks. One embodiment of the present invention relates to an improved wire-gate carabiner system including a frame, gate, and gate biasing system. The gate is pivotably coupled to the frame across an opening to form a continuously enclosed inner region in a closed configuration. The gate may be pivoted with respect to the frame about a pivot region to form the open configuration. The gate biasing system mechanically biases the gate toward the closed configuration. The gate may be referred to as a wire-type gate in that it includes an arch and two ends. The arch is looped over a hook disposed on the keyed region of the frame in the closed configuration. The two ends are pivotably coupled to the frame at two independent gate coupling points on the pivot region so as to utilize the torsional rigidity of the gate structure as the gate biasing system. The keyed region of the frame includes a hook and a cover. The cover is oriented and shaped to laterally shield the arch and hook from undesirable couplings. The cover is oriented to laterally cover the sides of the hook such that an item that is being removed from the carabiner will not attach or catch the hook as it is being removed from the inner region in the open configuration. The cover further increases the reliability of the releasable coupling between the gate and the hook in the closed configuration by minimizing potential lateral obstructions from contacting the arch of the gate. Alternative embodiments may utilize differing cover shapes, compositions, and structures including but not limited to two-component shapes, plastic compositions, and non-wire structures. While embodiments of present invention are described in reference to a wire-gate carabiner, it will be appreciated that the teachings of present invention are applicable to other areas including but not limited to non-wire gate carabiners that incorporate an exposed hook region on the frame.

The following terms are defined as follows:

Biasing—defaulting or urging a component toward a particular configuration. For example, a rubber band is biased toward a particular circumference; this means that if it is stretched and released, it will return to the biased circumference. A second example may include a public restroom door being biased toward a closed configuration; it may be opened, but upon release it automatically returns to the closed configuration. A third example may include an elevator being biased towards the first floor of a building; the elevator may be engaged to transfer to a particular floor, but upon completion it will automatically return to the first floor.

Carabiner—a mechanical device including a frame, a gate, and an inner region defined between the frame and gate. The gate is biased toward a closed configuration in which the inner region is continuous with regards to being enclosed by the frame and gate. In response to a particular force, the gate is configured to pivot with respect to the frame to create an opening of the inner region, thereby forming an open configuration.

Gate biasing system—a system of components configured to bias the gate of a carabiner toward a particular configuration.

Pivotably coupled—components which are coupled in a manner that facilitates a pivot type movement therebetween. For example, a door is pivotably coupled to a door frame to facilitate pivotal rotation about the door frame.

Enclosed region—a region which is geometrically contained within a perimeter. The enclosed region may be a two or three dimensionally enclosed region depending on the structure that forms the perimeter. For example, all carabiners form some type of two dimensional enclosed region when the gate and frame are positioned in the closed configuration. The enclosed region is only two dimensional in that the enclosed region may be used to couple or attach components.

Lengthwise—an orientation for measurement referring to the longest dimension of a mechanical component.

Wire—an elongated structure having two lengthwise ends and a particular cross-sectional shape. The term wire may broadly include various compositions such as metal and cross-sectional shapes such as circular. The wire may also be bent into a particular lengthwise shape or configuration including particular curvatures. For example, a bent "arch" region may include a curved region of more than ninety degrees.

Positive/Negative shaped—a particular structure or region may be expressed as having either a positive or negative shape with regards to a plane or base structure. A positive shape generally refers to a protrusion, while a negative shape refers to a depression. Therefore, a region may be positively shaped by protruding away from a structure as opposed to a negatively shaped recess in the same structure.

Two-dimensional looped coupling—a coupling between a loop and a hook structure that is oriented in a particular plane.

Keyed region—a combination of positive and/or negative shapes within a particular area. A corresponding structure may be configured to mate or key within the keyed region to form a particular type of coupling. The keyed region may also be referred to as the nose of the carabiner system.

Pivot region—a region about which one or more pivot points are disposed.

Figure 1:
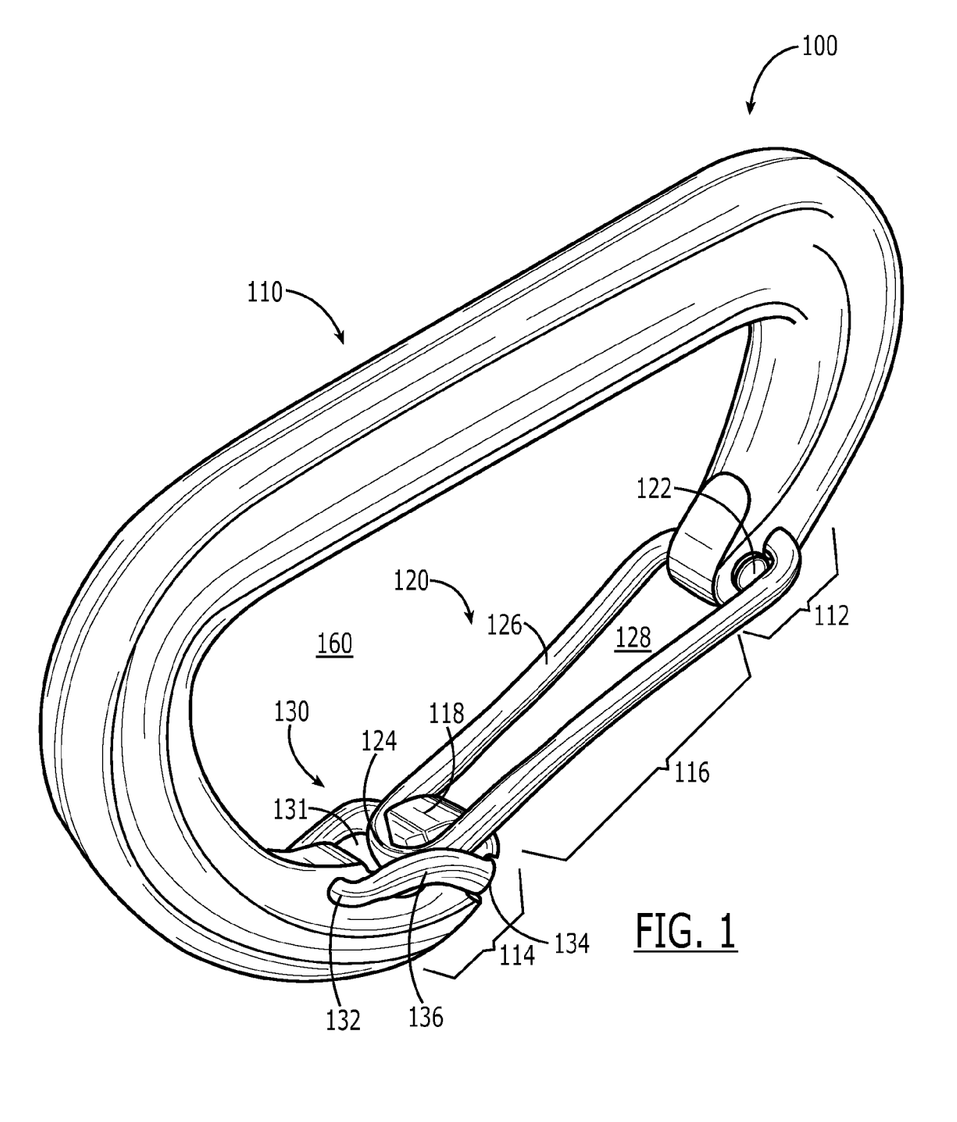
FIG. 1 illustrates a perspective view of a carabiner system in the closed configuration in accordance with one embodiment of the present invention.
Figure 2:
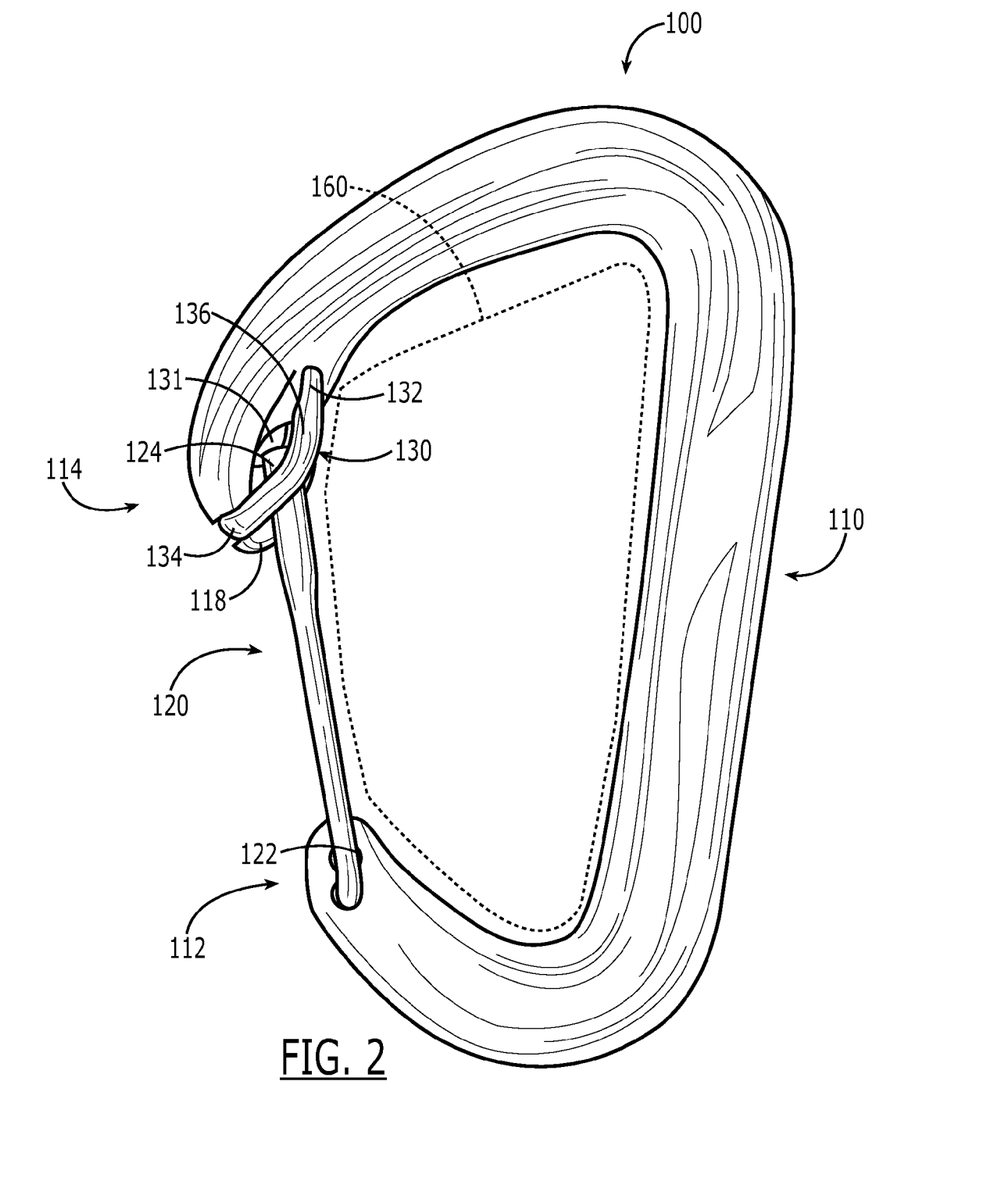
FIG. 2 illustrates a profile view of the carabiner system in FIG. 1.
Figure 3:
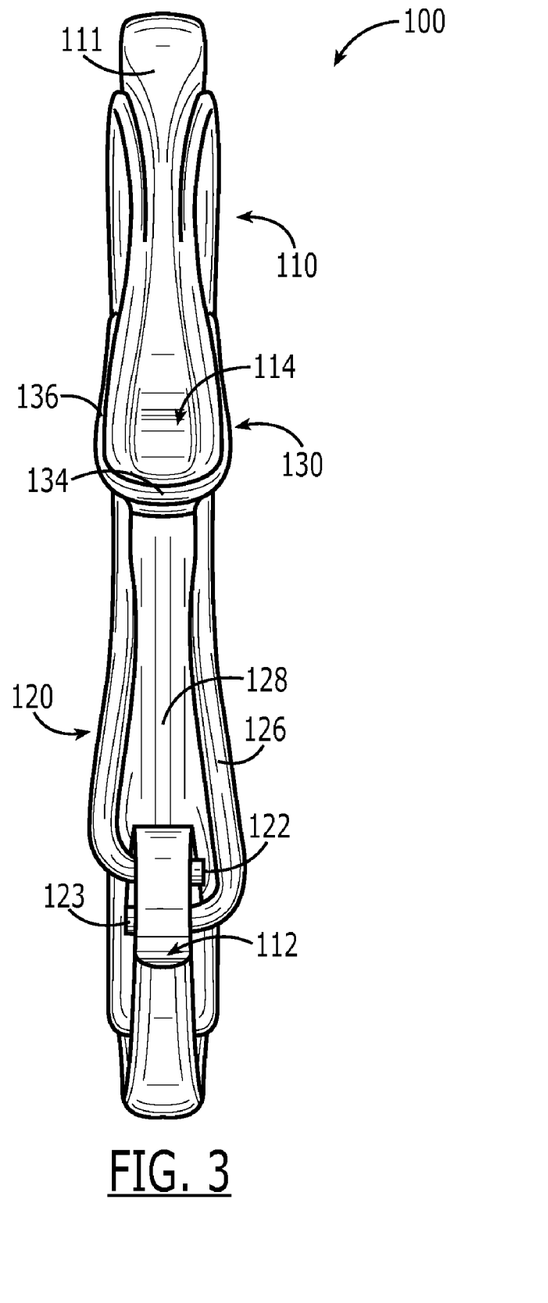
FIG. 3 illustrates a frontal view of the carabiner system of FIG. 1.
Figure 4:
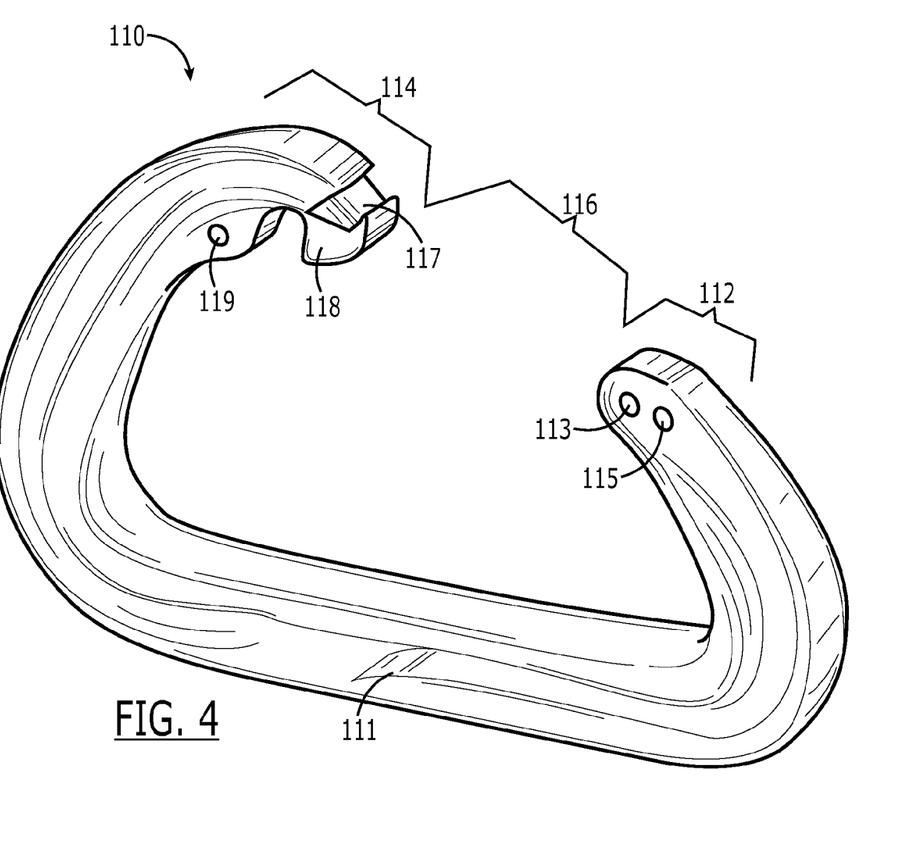
FIG. 4 illustrates a perspective view of the frame portion of the carabiner system of FIG. 1.
Figure 5:
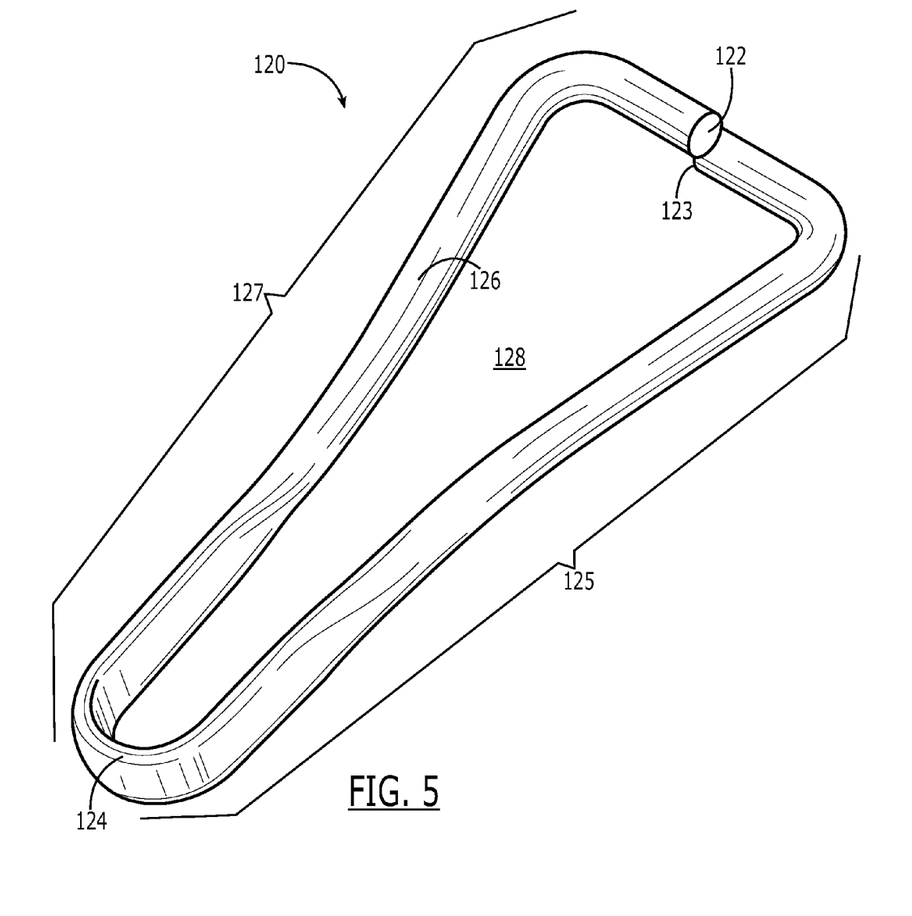
FIG. 5 illustrates a perspective view of the gate portion of the carabiner system of FIG. 1.
Figure 6:
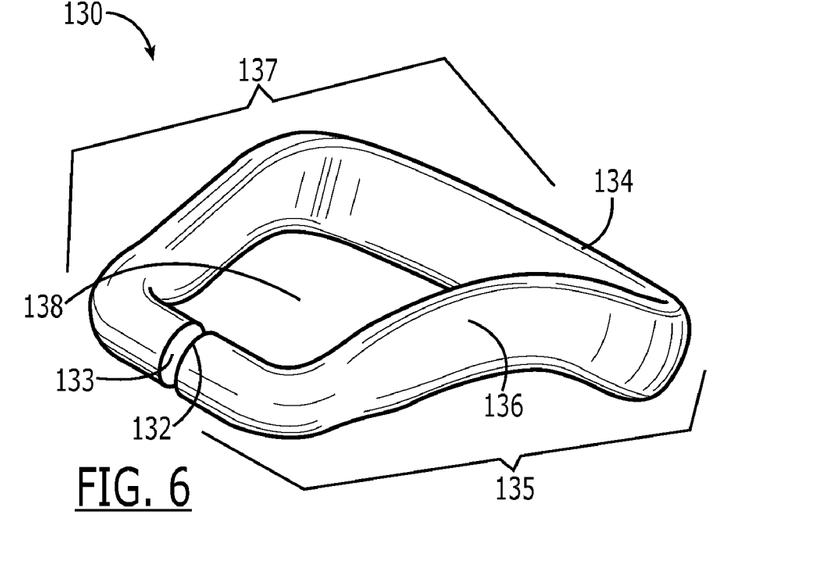
FIG. 6 illustrates a perspective view of the cover portion of the carabiner system of FIG. 1.
Figure 7A:
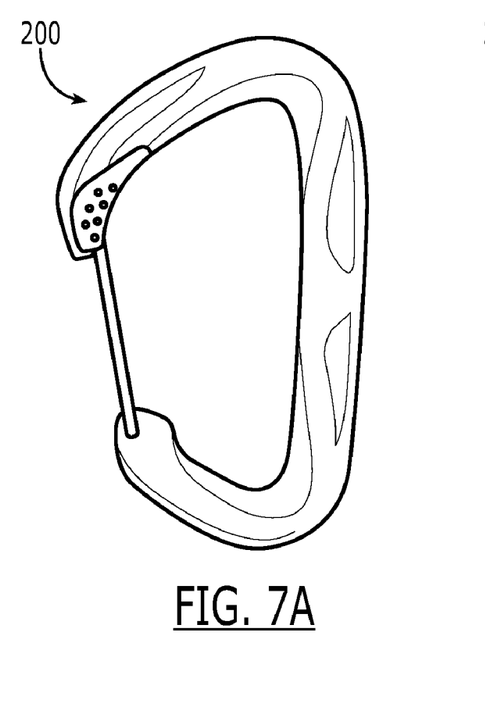
FIG. 7 illustrates a series of profile views of carabiner systems in accordance with alternative embodiments of the present invention.
Figure 7B:
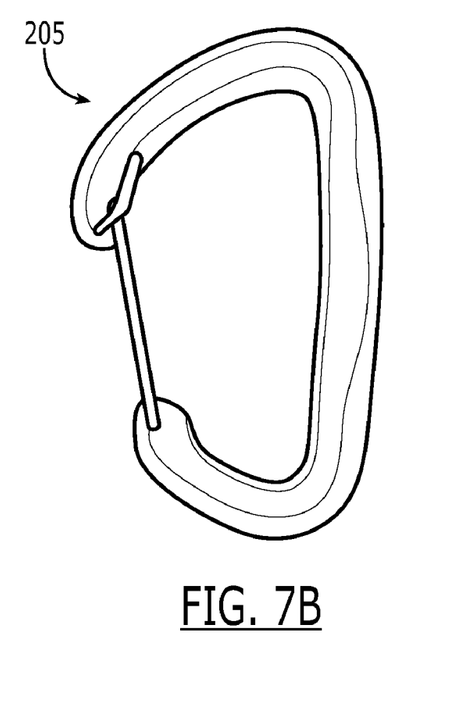
Figure 7C:
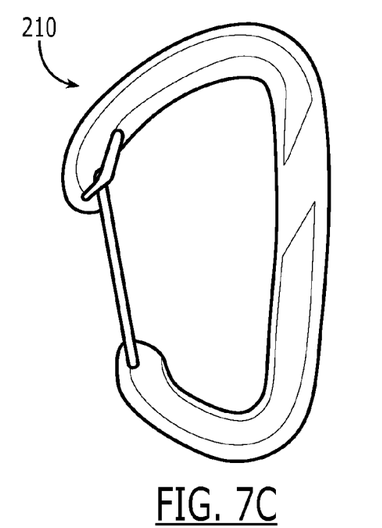
Figure 7D:
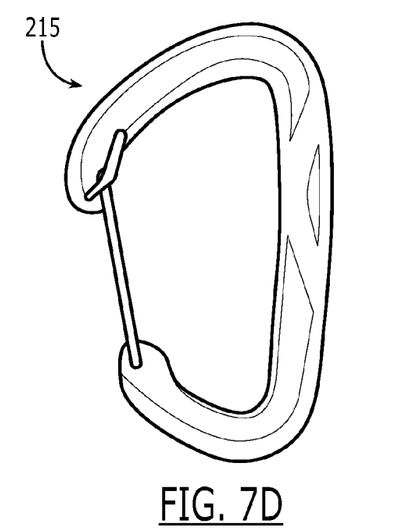
Figure 7E:
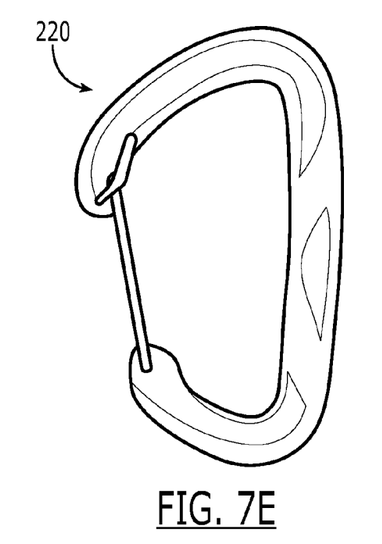
Figure 7F:
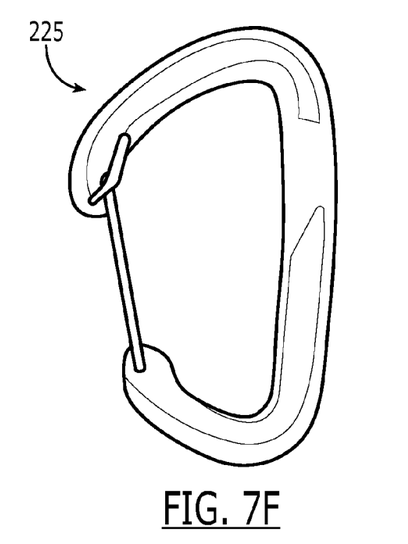
Figure 7G:
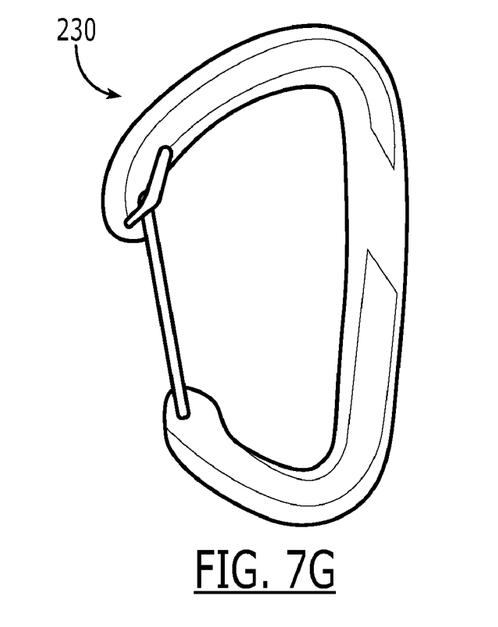
Figure 7H:
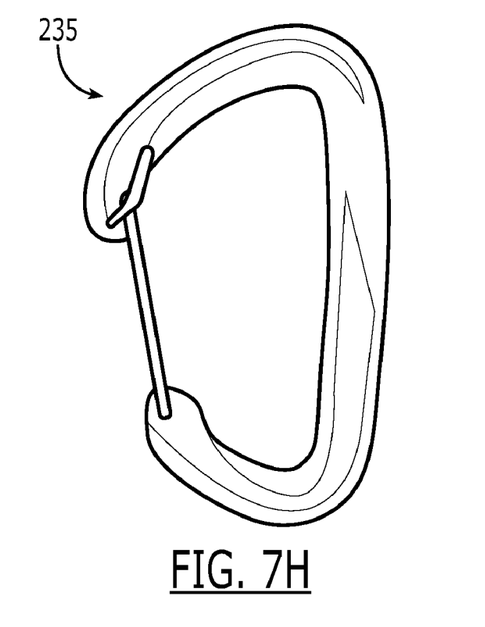
Figure 7I:
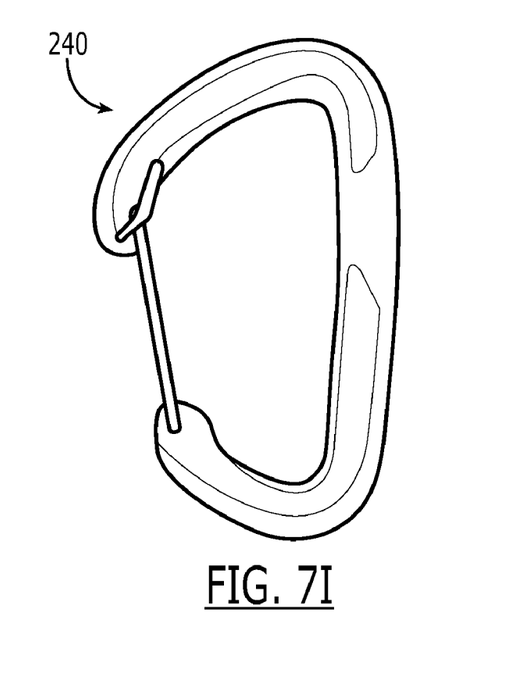

Reference is initially made to FIGS. 1-3, which illustrate various views of a carabiner system designated generally at 100. Reference is also made to FIGS. 4-6, which separately illustrate respective components of the carabiner system 100 so as to clearly illustrate design features. The system 100 includes a frame 110 and a gate 120. The gate 120 is pivotably coupled to the frame 110 to enable the selective engagement of either an open configuration (not shown) or a closed configuration (FIGS. 1-3). The frame 110 further includes a frame structure 111, a cover 130, a pivot region 112, a keyed region 114, and an opening 116 (FIG. 4). The cover 130 further includes a cover wire 136, a cover loop 134, a cover recess 138, and two cover ends 132, 133. The gate 120 further includes a wire 126, two ends 122, 123, an arch 124, and a recess 128. In the closed configuration, the gate 120 extends across the opening 116 between the pivot region 112 and the keyed region 114 to form a continuously enclosed two-dimensional interior region 160. In the open configuration (not shown), the gate 120 is pivoted about the pivot region 112 of the frame 110 so as to expose the opening 116 to the interior of the frame. A gate biasing system automatically urges the gate 120 toward the closed configuration. In the illustrated embodiments, the gate biasing system is incorporated within the coupling scheme and composition of the gate 120. The two lengthwise ends 122, 123 of the gate 120 are coupled to the frame 110 at two independent gate attachment points 113, 115 and are oriented opposite one another with respect to the lengthwise orientation of the frame structure 111. The spacing and opposite orientation of the lengthwise ends 122, 123 in combination with the overall shape of the gate 120 result in a torsional force on the gate 120 when selectively pivoted into the open configuration. The inherent torsional rigidity and/or composition properties of the gate 120 generate a rebound or spring response force which biases/pivots the gate back toward the closed configuration. It will be appreciated that various alternative gate biasing systems may also be utilized in accordance with the present invention including but not limited to the inclusion of one or more spring mechanisms.

Reference is made to FIG. 4 to clearly illustrate the individual components and/or structure of the frame 110, including illustrations of the frame structure 111, keyed region 114, opening 116, and pivot region 112. The frame 111 structure may be composed of various materials including metal and is generally shaped in a lengthwise curved C-shaped configuration. The cross-sectional shaping, composition, and/or curvatures of the frame structure 111 may be adjusted in particular regions to optimize characteristics such as weight and strength. The opening 116 is disposed between the pivot region 112 and the keyed region 114, which also correspond to the two lengthwise ends of the C-shaped frame structure 111. The keyed region 114 includes a specific combination of surfaces and/or points including a cover attachment point 119, a hook 118, and a cover notch 117. The hook 118 is a positive structure oriented substantially toward the interior of the frame structure 111. The cover notch 117 is a negative structure or recess oriented substantially away from the interior of the frame structure 111. The cover attachment point 119 is a lateral surface recess disposed on a lengthwise side of the keyed region 114 portion of the frame 110. The pivot region 112 is disposed on the opposite lengthwise end of the frame structure 111 and/or side of the opening 116 with respect to the keyed region 114. The pivot region 112 includes first and second gate attachment points 113, 115. The first and second gate attachment points 113, 115 include lateral surface recesses disposed on the lengthwise side of the pivot region 112 portion of the frame 110.

Reference is made to FIG. 5 to clearly illustrate the individual components and/or structure of the gate 120 including the wire 126, two lengthwise ends 122, 123, arch 124, and two parallel gate regions 125, 127. The gate wire 126 is a substantially elongated member which may be composed of a metal material having particular torsional rigidity properties necessary for the gate biasing system. In addition, the wire 126 composition possesses a minimum tensile strength necessary to create the required overall tensile strength of the system 100 in the closed configuration in accordance with proper carabiner safety certifications. In addition, the wire 126 is shaped in a particular lengthwise and cross-wise configuration to form the recess 128 and releasably couple with the frame 110 in the closed configuration of the system 100. The illustrated shape includes the curved arch 124 across which the wire 126 includes a substantially 180 degree bend. The arch 124 creates a negative shaped loop region which is specifically keyed/sized so as to be selectively disposed over the positively shaped hook 118 of the frame 110 to engage a releasable coupling in at least one two dimensional plane in the closed configuration of the system 100. In addition, the arch 124 includes a specific cross-sectional shaping that is keyed to match the hook 118 thereby increasing the reliability and durability of the releasable coupling with the hook 118. The illustrated wire further includes a lengthwise expansion curvature/taper toward the lengthwise ends 122, 123 to enable the lateral coupling scheme of the ends 122, 123 to the frame 110. The wire 126 also includes two lengthwise curvatures of approximately ninety degrees disposed in substantial proximity to each of the lengthwise ends 122, 123. It will be appreciated that the lengthwise shape of the wire 126 may include additional lengthwise and crosswise curvatures and tapers to provide additional functionalities. The lengthwise ends 122, 123 are routed through separate corresponding gate attachment points 113, 115 in the frame 110 respectively. As discussed above, the separate coupling position of the two lengthwise ends 122, 123 with respect to the frame operates to effectuate the automatic gate biasing force in response to pivoting the gate 120. The parallel gate regions 125, 127 refer to the substantially parallel regions of the wire 126 disposed between the arch 124 and each of the lengthwise ends 122, 123 respectively.

Reference is made to FIG. 6 to clearly illustrate the individual components and/or structure of the cover 130 of the frame 110 including the cover wire 136, cover loop 134, two cover ends 132, 133, and two parallel cover regions 135, 137. The illustrated cover 130 is a separate component/member which may be separately assembled with the frame 110. However, it will be appreciated that alternative embodiments may include a cover that is inherently integrated and/or molded with the frame 110. The illustrated separate cover 130 configuration provides specific manufacturing cost savings and operational features which will be discussed in more detail below. The cover wire 136 is a substantially elongated member which may be composed of a metal material. The cover wire 136 is shaped in a particular lengthwise and crosswise configuration to form the cover recess 138 configured to be disposed on the frame. The illustrated shape includes the cover loop 134 across which the cover wire 136 includes a substantially 180 degree bend. The cover loop 134 creates a positive shaped configuration which is specifically keyed and/or sized to mate within the cover notch 117 of the frame 110. In addition, the cover loop 134 includes a specific cross-sectional shaping that is further keyed to match the cover notch 117. The illustrated cover wire 136 further includes lengthwise medial curvatures specifically positioned and oriented on the frame 110 to enable shielding of the gate 120 arch 124 region in the closed configuration of the system 100. The specific shielding operational advantages of the cover 130 with respect to the gate 120 will be described in more detail in the operational section below. The cover wire 136 also includes two lengthwise curvatures of approximately ninety degrees disposed in substantial proximity to each of the cover ends 132, 133. It will be appreciated that the lengthwise shape of the cover wire 136 may include additional lengthwise and crosswise curvatures and tapers to provide additional functionalities and mating characteristics with the frame 110. The cover ends 132, 133 are routed through a common cover attachment point 119 on the frame 110.

In operation, the system 100 illustrated in FIGS. 1-3 includes specific functionalities as a result of the unique configuration of the frame 110, gate 120, and cover 130. In the illustrated closed configuration of the system 100, the arch 124 of the gate 120 is looped over the hook 118 of the frame 110 to form a releasable coupling that provides significant tensile strength to the overall system. The cover 130 creates a lateral shielding or hood effect to partially encapsulate the three dimensional region including the hook 118 and the arch 124. This partial encapsulation provides a plurality of benefits. First, the partial encapsulation may increase the reliability of the coupling during operation by preventing debris and lateral obstructions from dislodging or otherwise effecting the relative placement of the arch 124 with respect to the hook 118. Second, the unique separated frame 110 and cover 130 configuration provides for the inclusion of a gap 131 (FIG. 2) or channel between the cover 130 and the keyed region 114 of the frame 110. The gap 131 efficiently enables small particle debris to flow away from the coupling between the arch 124 and the hook 118. Third, the partial encapsulation prevents undesirable hooking or snaring of the hook 118 by external objects. For example, when an object/loop (not shown) is removed from the system 100, the cover 130 prevents the object/loop from snaring the hook 118 as it is routed out the opening 116 of the frame 110 subsequent to the gate 120 pivoting with respect to the frame 110 to form the open configuration of the system 100. The partial encapsulation therefore provides operational reliability and efficiency benefits commonly associated with non-wire, non-hook type conventional carabiner systems. In addition, the partial encapsulation further provides weight and manufacturing cost benefits commonly associated with conventional wire-gate carabiners.

Reference is next made to FIG. 7, which illustrate various carabiner systems with covered keyed regions on the frame in accordance with alternative embodiments of the present invention, designated generally at 200, 205, 210, 215, 220, 225, 230, 235, and 240 respectively.

It should be noted that various alternative carabiner system designs may be practiced in accordance with the present invention, including one or more portions or concepts of the embodiment illustrated in FIG. 7 or described above. For example, the cover may include two independent regions on either side of the hook or may include a single region disposed on one side of the hook. Various other embodiments have been contemplated, including combinations in whole or in part of the embodiments described above.

What is claimed is:

1. A carabiner system comprising:
   a frame including an opening between a pivot region and a keyed region;
   a gate pivotably coupled to the frame across the opening, wherein the gate and frame form a continuously enclosed inner region in a closed configuration, and wherein the gate is pivotably rotated about the pivot region forming a gap between the gate and frame in the open configuration;
   a gate biasing system coupled to the frame and gate, biasing the gate toward the closed configuration with respect to the frame;
   wherein the gate comprises an arch and two ends, and wherein the arch is releasably coupled to the frame at the keyed region in the closed configuration, and wherein the two ends are pivotably coupled to the frame at the pivot region in both the open and closed configurations, and wherein the gate further includes a recess between the arch and two ends; and
   wherein the keyed region of the frame further includes a hook and a cover, and wherein the hook is disposed within the arch of the gate in the closed configuration, and wherein the cover encircles the hook and arch in the closed configuration.

2. The carabiner system of claim 1, wherein the cover includes two frame coupling points and a loop.

3. The carabiner system of claim 2, wherein the two frame coupling points are oppositely coupled to the frame, and wherein the loop two dimensionally encircles the hook within the recess in the closed configuration.

4. The carabiner system of claim 1, wherein the cover comprises an elongated wire member.

5. The carabiner system of claim 1, wherein the hook is a three dimensional positive shaped structure oriented substantially perpendicular to the opening.

6. The carabiner system of claim 1, wherein the coupling between the arch and the hook in the closed configuration includes a two dimensional looped coupling.

7. The carabiner system of claim 1, wherein the gate and cover are oriented substantially parallel.

8. The carabiner system of claim 1, wherein the gate and cover both comprise an elongated wire structure bent in a substantially U-shaped configuration such that the lengthwise ends are substantially adjacent.

9. The carabiner system of claim 1, wherein the keyed region further includes a cover notch and two cover coupling points, and wherein the cover is coupled to the frame at both the cover coupling points and oriented to extend across the cover notch.

10. The carabiner system of claim 9, wherein the cover includes two parallel cover regions each extending over the hook and between one of the cover coupling points and the cover notch.

11. The carabiner system of claim 10, wherein the two parallel cover regions include a less than ninety degree curvature.

12. The carabiner system of claim 10, wherein the two parallel cover regions are intercoupled across the cover notch.

13. The carabiner system of claim 1, wherein the pivot region of the frame includes two independently located gate coupling points.

14. The carabiner system of claim 13, wherein the gate includes two parallel gate regions extending between one of the gate coupling points and the hook in the closed configuration.

15. The carabiner system of claim 14, wherein the two parallel gate regions are substantially straight.

16. The carabiner system of claim 14, wherein the two parallel gate regions are intercoupled across the hook the in the closed configuration.

17. A carabiner system comprising:
   a frame including an opening between a pivot region and a keyed region;
   a gate pivotably coupled to the frame across the opening, wherein the gate and frame form a continuously enclosed inner region in a closed configuration, and wherein the gate is pivotably rotated about the pivot region forming a gap between the gate and frame in the open configuration;

a gate biasing system coupled to the frame and gate, biasing the gate toward the closed configuration with respect to the frame;

wherein the gate comprises an arch and two ends, and wherein the arch is releasably coupled to the frame at the keyed region in the closed configuration, and wherein the two ends are pivotably coupled to the frame at the pivot region in both the open and closed configurations, and wherein the gate further includes a recess between the arch and two ends; and wherein the keyed region of the frame further includes a hook, a cover notch, a cover coupling point, and a cover, and wherein the hook is between the cover coupling point and the cover notch, and wherein the cover includes two parallel cover regions extending over the hook and between the cover coupling point and cover notch, and wherein the hook is disposed within the arch of the gate in the closed configuration.

18. The carabiner system of claim 17, wherein the coupling between the arch and the frame in the closed configuration includes looping the arch over the hook.

19. A carabiner system comprising:

a frame including an opening between a pivot region and a keyed region;

a gate pivotably coupled to the frame across the opening, wherein the gate and frame form a continuously enclosed inner region in a closed configuration, and wherein the gate is pivotably rotated about the pivot region forming a gap between the gate and frame in the open configuration;

a gate biasing system coupled to the frame and gate, biasing the gate toward the closed configuration with respect to the frame;

wherein the gate comprises an arch and two ends, and wherein the arch is releasably coupled to the frame at the keyed region in the closed configuration, and wherein the two ends are pivotably coupled to the frame at the pivot region in both the open and closed configurations, and wherein the gate further includes a recess between the arch and two ends; and wherein the keyed region of the frame further includes a hook and a cover, and wherein the hook is positively oriented substantially perpendicular to the opening and within the continuously enclosed inner region, and wherein the cover extends over at least one side of the hook and the arch in the closed configuration, and wherein the hook is disposed within the arch of the gate in the closed configuration.

20. The carabiner system of claim 19, wherein cover extends between a cover coupling point and a cover notch on the keyed region of the frame.

* * * * *